(12) United States Patent
Bergmann et al.

(10) Patent No.: US 10,113,899 B2
(45) Date of Patent: Oct. 30, 2018

(54) APPARATUS FOR DETERMINING FILL LEVEL OF A FILL SUBSTANCE IN A CONTAINER WITH PROCESS ISOLATION HAVING AT LEAST TWO PLASTICS

(71) Applicant: Endress + Hauser GmbH + Co. KG, Maulburg (DE)

(72) Inventors: Eric Bergmann, Steinen (DE); Klaus Feisst, Sr., Stegen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 98 days.

(21) Appl. No.: 15/032,356

(22) PCT Filed: Nov. 3, 2014

(86) PCT No.: PCT/EP2014/073518
§ 371 (c)(1),
(2) Date: Apr. 27, 2016

(87) PCT Pub. No.: WO2015/082146
PCT Pub. Date: Jun. 11, 2015

(65) Prior Publication Data
US 2016/0273954 A1    Sep. 22, 2016

(30) Foreign Application Priority Data

Dec. 6, 2013 (DE) .................. 10 2013 113 642

(51) Int. Cl.
*G01L 23/00* (2006.01)
*G01F 23/284* (2006.01)
(Continued)

(52) U.S. Cl.
CPC ........... *G01F 23/284* (2013.01); *H01Q 1/225* (2013.01); *H01Q 13/02* (2013.01)

(58) Field of Classification Search
None
See application file for complete search history.

(56) References Cited

U.S. PATENT DOCUMENTS 6,155,112 A * 12/2000 Eckert .................. G01F 23/284
    343/753
6,276,199 B1   8/2001 Eckert et al.
(Continued)

FOREIGN PATENT DOCUMENTS

DE    102005036844 A1    2/2007
DE    102006003742 A1    8/2007
(Continued)

OTHER PUBLICATIONS

English Translation of International Preliminary Report on Patentability, WIPO, Geneva, dated Jun. 16, 2016.
(Continued)

*Primary Examiner* — Peter Macchiarolo
*Assistant Examiner* — Jermaine Jenkins
(74) *Attorney, Agent, or Firm* — Bacon & Thomas, PLLC

(57) ABSTRACT

An apparatus for determining or monitoring the fill level of a fill substance located in a container in a process, comprising: a signal producing unit; an in-coupling/out-coupling unit an antenna unit; wherein the antenna unit has a hollow conductor and an antenna element widening toward the fill substance and the antenna unit transmits high-frequency measuring signals in the direction of the surface of the fill substance and receives echo signals reflected on the surface of the fill substance; and a control/evaluation unit, which ascertains the fill level of the fill substance in the container based on travel time of the measuring signals. In or on the antenna unit a process isolation is provided, which is at least approximately transparent for the high-frequency measuring signals and which protects the in-coupling/out-coupling unit against influences of the process. The process isolation is an (Continued)

isostatically pressed, molded part, which is manufactured of at least two plastics having different physical and/or chemical properties.

10 Claims, 3 Drawing Sheets

(51) Int. Cl.
 *H01Q 1/22* (2006.01)
 *H01Q 13/02* (2006.01)

(56) References Cited

U.S. PATENT DOCUMENTS

| | | | | |
|---|---|---|---|---|
| 6,325,391 | B1* | 12/2001 | Smith | G01F 23/284 277/312 |
| 6,661,389 | B2 | 12/2003 | Griessbaum et al. | |
| 6,859,187 | B2 | 2/2005 | Ohlsson | |
| 7,255,002 | B2* | 8/2007 | Gravel | G01F 23/284 73/290 R |
| 7,814,789 | B2* | 10/2010 | Schroth | G01F 23/284 73/290 V |
| 8,482,296 | B2* | 7/2013 | Reimelt | G01F 23/284 324/124 |
| 8,890,759 | B2 | 11/2014 | Pantea et al. | |
| 2002/0066314 | A1* | 6/2002 | Lubbers | G01F 23/284 73/290 R |
| 2007/0188396 | A1 | 8/2007 | Griessbaum et al. | |
| 2009/0212996 | A1* | 8/2009 | Chen | G01F 23/284 342/124 |

FOREIGN PATENT DOCUMENTS

| | | |
|---|---|---|
| EP | 2584652 A1 | 4/2013 |
| WO | 03078936 A1 | 9/2003 |

OTHER PUBLICATIONS

International Search Report,, EPO, The Netherlands, dated Jan. 23, 2015.
German Search Report, German PTO, Munich, dated Mar. 27, 2014.

* cited by examiner

APPARATUS FOR DETERMINING FILL LEVEL OF A FILL SUBSTANCE IN A CONTAINER WITH PROCESS ISOLATION HAVING AT LEAST TWO PLASTICS

TECHNICAL FIELD

The invention relates to an apparatus for determining or monitoring the fill level of a fill substance located in a container in a process.

BACKGROUND DISCUSSION

Radar measuring devices determine the fill level of a fill substance in a container via the travel time of measuring signals. Travel-time methods utilize the physical law that the travel distance equals the product of travel time and propagation velocity of the measuring signals. In the case of fill level measurement, the travel distance is twice the separation between the antenna and the surface of the fill substance. If the measuring signals are microwaves, then the wanted echo signal, thus the part of the measuring signals reflected on the surface of the fill substance, and its travel time are determined based on the so-called echo function, respectively the digital envelope curve. The envelope curve plots the amplitudes of the echo signals as a function of the separation 'antenna-surface of the fill substance'. The fill level can then be determined from the difference between the known separation of the antenna from the floor of the container and the separation of the surface of the fill substance from the antenna, as determined from the measuring.

In the case of microwaves measuring devices, one distinguishes between measuring devices, which work according to the pulse radar method and utilize broadband high-frequency pulses, and FMCW measuring devices (Frequency Modulated Continuous Wave), in the case of which continuous microwaves of wavelength $\lambda$ are periodically linearly frequency modulated, e.g. with a sawtooth voltage.

In order to assure a constantly good measuring performance, the antenna elements radiating and receiving the measuring signals and the measuring electronics are sealed on the process-side with process isolation elements against external influences. Depending on location of use, the fill level measuring devices may experience high temperatures, high pressures and/or aggressive chemical media. As a function of conditions reigning at the measuring location, requirements placed on protection of the sensitive electronics components are correspondingly high.

Known from published international patent application WO 2006/120124 A1 is a fill-level measuring device, in the case of which the horn antenna is at least partially filled with a temperature-stable, dielectric material. The dielectric material is so dimensioned that, at normal temperature, a defined separation between the outer surface of the dielectric filler body and the inner surface of the adjoining antenna element is present. Due to such embodiment, the filler body can expand with increasing temperature, so that no mechanical stresses occur within the filler body.

In the case of radar measuring devices sold by the applicant under the mark, MICROPILOT, the process isolation is usually manufactured of PTFE. PTFE has the advantage that it is almost transparent for microwaves. Additionally, it has a temperature-, pressure- and/or chemical durability sufficient for a large number of applications in process automation. Moreover, PTFE has the advantage that it makes accretion formation difficult. If accretion formation does nevertheless occur on the process isolation, then cleaning it away is quite easy.

The process isolations are preferably isostatically pressed and subsequently brought to final shape by mechanical processing. The isostatically pressed components are distinguished by a high homogeneity, whereby sensor downtimes and measurement error—caused by inhomogeneities in the region of the process isolation—can be excluded.

In process isostatic pressing, the physical effect is utilized that pressure propagates in liquids and gases in all directions uniformly and produces on areas exposed to it forces, which are directly proportional to such areas. In the case of PTFE processing, a rubber mold is filled with plastic powder or granular plastic, especially with PTFE powder or PTFE granules, and then brought liquid tightly closed into the pressure vessel of a pressing apparatus. The pressure, which acts via the liquid in the pressure vessel on all sides of the rubber mold, compresses the enclosed PTFE powder uniformly. After the pressing, the PTFE molded part is removed from the rubber mold and sintered in a sinter oven.

A disadvantage of isostatically pressed PTFE process isolations is that PTFE is relatively expensive. PP powder, respectively PP granular material, is less expensive than PTFE granular material, respectively PTFE powder, by about a factor of 10.

SUMMARY OF THE INVENTION

The apparatus for determining or monitoring the fill level comprises: a signal producing unit, which produces high-frequency measuring signals; an in-coupling/out-coupling unit, which couples the high-frequency measuring signals into an antenna unit, respectively out of the antenna unit; wherein the antenna unit has a hollow conductor and an antenna element widening toward the fill substance. Via the antenna unit, the high-frequency measuring signals are transmitted in the direction of the surface of the fill substance, and echo signals reflected on the surface of the fill substance are received. A control/evaluation unit ascertains fill level of the fill substance in the container based on travel time of the measuring signals. In or on the antenna unit, a process isolation is provided, which is at least approximately transparent for the high-frequency measuring signals and which protects the in-coupling/out-coupling unit against influences of the process.

An object of the invention is to provide a cost effective process isolation for a fill-level measuring device.

The object is achieved by features including that the process isolation is an isostatically pressed, molded part, which is manufactured of at least two plastics having different physical and/or chemical properties, wherein each of the at least two plastics is provided in respectively defined regions of the process isolation.

Preferably, the two plastics comprise a first plastic having a first dielectric constant and a second plastic having a second dielectric constant, wherein the two dielectric constants are at least approximately equal. This embodiment has the advantage that the microwaves pass through the process isolation at least approximately undisturbed.

The process isolation is embodied as one unit. The at least two different plastics, which are located in different regions of the process isolation, are connected with one another in an isostatic pressing method; the pressed unit is then sintered and machined. Of course, in a transitional region between the two different plastics, particles of both plastics can be found.

In an advantageous embodiment of the apparatus of the invention, the process isolation is embodied gas tightly. A gas-tight process isolation prevents gases from the process from getting into the electronics area of the measuring devic.

Furthermore, it is provided in connection with the solution of the invention that the first plastic has a higher temperature-, pressure- and/or chemical durability than the second plastic. Especially, the first plastic with the higher temperature-, pressure- and/or higher chemical durability is arranged in the defined region of the process isolation, which faces the process, respectively contacts the process. In this connection, it is especially advantageous for reasons of cost that the defined region, in which the first plastic is arranged, is embodied essentially as a surface layer.

Preferably, the thickness of the surface layer of the first plastic amounts to $\lambda/4$. In such case, $\lambda$ is the wavelength of the high-frequency measuring signals (FMCW method) or the center wavelength of a pulse of the high-frequency measuring signals (pulse radar method). This embodiment is advantageous and cancels phase jumps, which occur at the interface between two plastics, when these differ in their dielectric constants.

An advantageous form of embodiment of the apparatus of the invention provides that the process isolation includes a gasket, which is composed of the first plastic or a third plastic, which has a high temperature-, pressure- and/or and chemical durability comparable to that of the first plastic, wherein the diameter of the gasket is greater than the maximum diameter of the antenna element.

Advantageously, the first plastic or the third plastic is PTFE or PEEK, while the relatively cost effective PP is used as the second plastic. Likewise, PFA (perfluoroalkoxy-copolymer) can be used. The plastics, polytetra-fluoroethylene and perfluoroalkoxy-copolymer, have good chemical and physical properties, which favor them for application for a process isolation. To be mentioned are especially durability against almost all chemicals, the very high temperature resistance, the good microwave transmissivity and the good HF-performance.

Preferred is the combination of PTFE and PP, wherein the relatively expensive PTFE is provided in the process facing, respectively the medium-contacting, region of the process isolation, due to its high temperature- and pressure resistance and due to its high chemical durability, while the region of the process isolation facing away from the process is composed of the more cost effective PP. The combination of these two plastics has, moreover, the advantage that no undesired reflections of the microwaves occur in the transitional region between the two plastics, since the dielectric constants of the two plastics are almost equal.

Another combination, which is especially advantageous when the measuring device is applied at higher temperatures, is composed of PEEK and PTFE. PEEK is more temperature stable than PTFE and tends less to flow than PTFE. Therefore, PEEK is used in the edge region of the process isolation, especially in the region of the gasket, while the process isolation inwards of the gasket is essentially composed of PTFE.

If the dielectric constants of the plastics used for the process isolation are different, then a phase jump occurs in the transitional region. Suitable measures can be applied in such case—e.g. the coating thickness of one of the two plastics is so dimensioned that the shifting corresponds essentially to $\lambda/4$ or an integer multiple of $\lambda/4$, wherein $\lambda$ is the frequency of the microwaves or the center frequency of the microwave pulse. As a result of the influencing of the phase shift by a so-called $\lambda/4$ waveplate, the phase-shifted microwaves interfere destructively.

Moreover, it is advantageous to introduce electrically conductive particles into the first plastic and/or into the third plastic—thus into the plastic, which is arranged process-contactingly. In this way, an electrical charging of the process isolation is prevented, such being of special importance especially for use in explosion-endangered regions.

An optimizing of the high-frequency matching can be achieved as follows: The high-frequency transition from free space (DK=1), or air, into an antenna unit 3 filled with dielectric material, especially plastic, especially into a horn antenna, respectively into the hollow conductor 4 of a horn antenna, occurs in the case of a high dielectric constant of the fill material via a $\lambda/4$ transformer, which is formed of one or more layers, wherein the dielectric constants of the individual layers lie, in each case, between that of the dielectric fill material and that of air. The thickness of the individual layers amounts, in each case, preferably to $\lambda/4$ or to a whole number multiple of $\lambda/4$. By isostatic pressing of a plurality of layers of different plastics with the corresponding thicknesses, a process isolation 10 transparent for high-frequency measuring signals can be especially simply and cost effectively manufactured.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
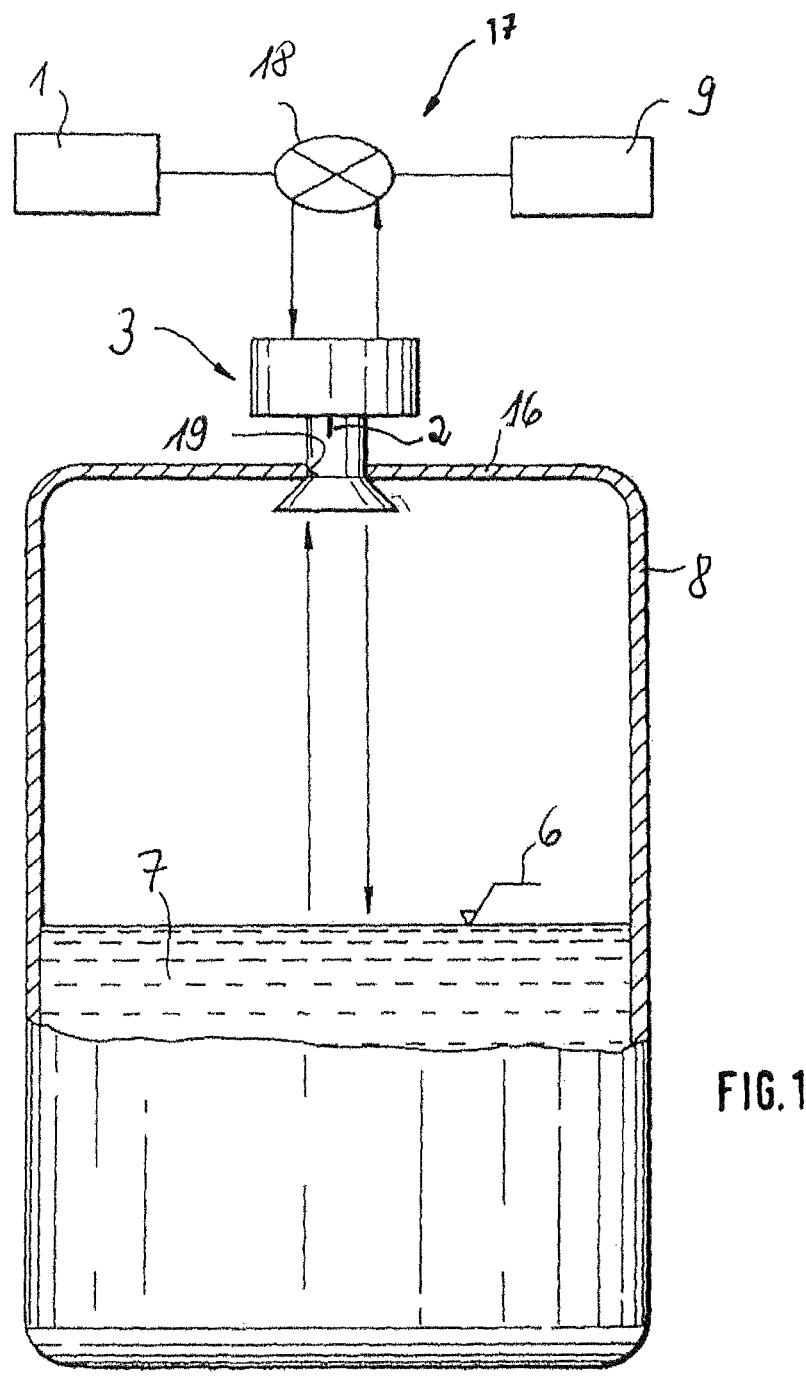
FIG. 1 a first form of embodiment of the apparatus of the invention.

FIG. 1 shows a schematic representation of an embodiment of the apparatus of the invention. A fill substance 7 is present in the container 8. Serving for determining the fill level of the fill substance 7 is the fill-level measuring device 17, which is mounted in an opening 19 in the lid 16 of the container 8. Via the antenna unit 3, measuring signals produced in the signal producing unit 1 and coupled via the in-coupling/out-coupling unit 2 are radiated in the direction of the surface 6 of the fill substance 7. Sent signals are partially reflected on the surface 6 as echo signals. The echo signals are received by the antenna unit 3, out-coupled via the in-coupling/out-coupling unit 2 and evaluated in the control/evaluation unit 9. Associated with the control/evaluation unit 9 is a delay circuit, such as described, for example, in DE 31 07 444 A1. The correct clocking of transmission of the sent signals and receipt of the echo signals occurs via the transmitting-receiving separator, or directional coupler, 18. The components 1, 9, 18 are part of the so-called measuring transmitter and are usually arranged in a transmitter housing not separately illustrated in FIG. 1.

Figure 2:
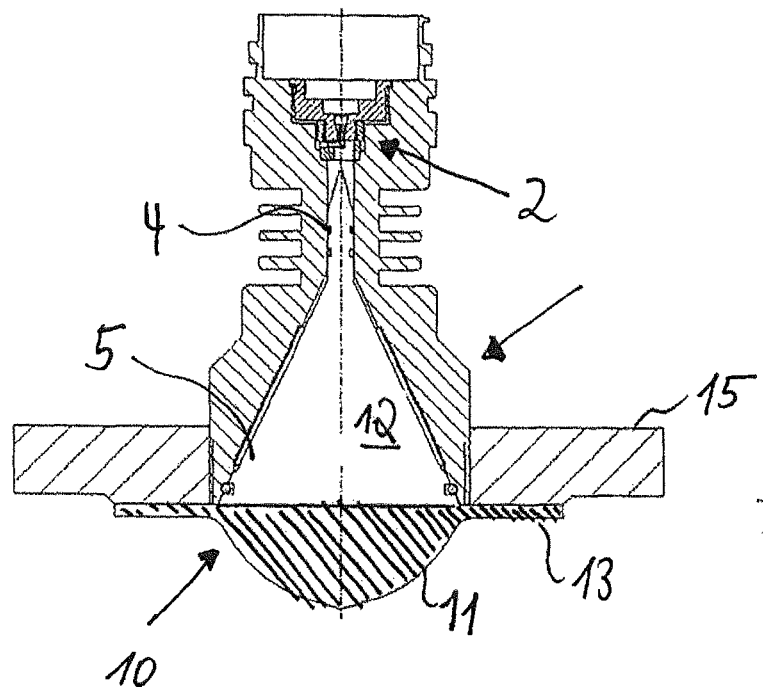
FIG. 2 a second form of embodiment of the apparatus of the invention.
Figure 3:
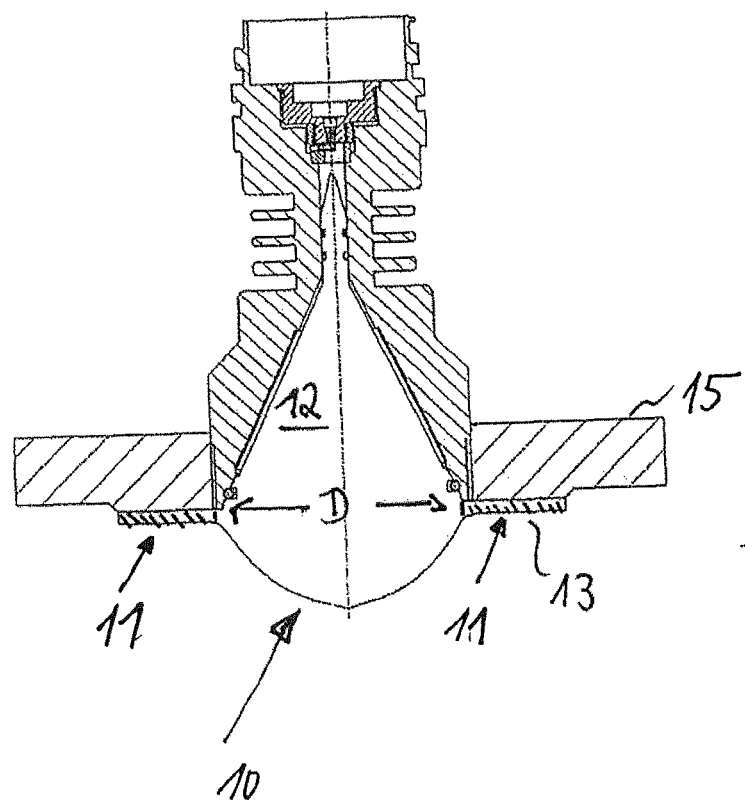
FIG. 3 a third form of embodiment of the apparatus of the invention.
Figure 4:
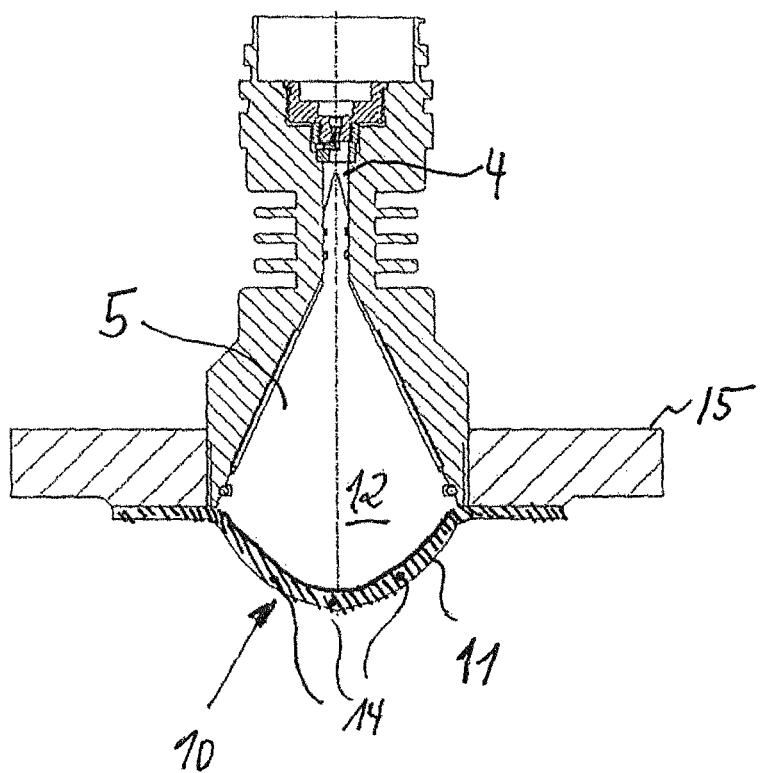

Different embodiments of the antenna unit 3 with the process isolation 10 of the invention are shown in FIGS. 2, 3 and 4. Process isolation 10 is preferably so embodied that it is at least approximately transparent for the microwaves. This is achieved by using for the process isolation 10 plastics 11, 12, whose dielectric constants DK1, DK2 are approximately equal or whose dielectric constants DK1, DK2 deviate so slightly from one another that resulting disturbances lead to measurement errors of the fill-level measuring device 17, which lie within tolerable limits. Preferably, PTFE (polytetrafluoroethylene) and PP (polypropylene) are used.

If the dielectric constant of the utilized plastics 11, 12 differs in such a manner that the disturbances lead to measurement errors, which are no longer tolerable, then occurring phase shifts are suitably corrected, e.g. via a $\lambda/4$ waveplate, respectively $\lambda/4$ layer thicknesses.

Process isolation 10 protects especially the in-coupling/out-coupling unit 2 against damaging influences of the process. In principle, the process isolation 10—seen in the radiating direction of the high-frequency measuring signals—protects all components of the fill-level measuring device 17 lying behind the medium-contacting region of the process isolation 10.

According to the invention, the process isolation 10 is an isostatically pressed, molded part, which is manufactured of at least two plastics 11, 12 having different physical and/or chemical properties. Each of the at least two plastics 11, 12 is provided in a defined region of the process isolation 10. Preferably, the process isolation 10 is embodied gas tightly.

FIG. 2 shows an antenna unit 3 composed of a hollow conductor 4 and an antenna element 5 widening in the radiating direction of the microwaves. Antenna element 3 is composed of an electrically conductive material, e.g. stainless steel or a conductive plastic. The process isolation 10 composed as a molded part of a number of plastics is produced via isostatic pressing.

In order to assure a reflection-poor transition for the high-frequency measuring signals, the process facing surface of the process isolation 10 is embodied convexly. By this embodiment, wavefront phase differences, which occur in the antenna unit 3, can be erased. However, also planar, conical or concave transition geometries provide other options for forming desired radiation characteristics.

The high-frequency measuring signals are in- and out-coupled via an in-coupling/out-coupling unit 2 to, respectively from, the hollow conductor 4. The hollow conductor 4 can be embodied as a round- or rectangular, hollow conductor. Preferably, the hollow conductor 4 is so embodied that a TE-wave mode forms. In the region of the hollow conductor 4, the process isolation element 10 has the shape of a cone tip or a stepped pyramid. As a result of the tapered embodiment, a good matching between the regions of the hollow conductor filled with air and dielectric material can be achieved. This matching prevents that measuring signals fed via the in-coupling/out-coupling unit 2 are partially reflected back and attenuated. Of course, the hollow conductor 4 can also be filled completely with the dielectric material of the process isolation 10.

In the case of the form of embodiment of the process isolation 10 of the invention shown in FIG. 2 manufactured via an isostatic pressing method, the process contacting region of the process isolation 10, respectively the region of the process isolation 10 including the gasket 13 facing the fill substance 7, is composed of PTFE, while the region of the process isolation 10 facing away from the process is composed of PP.

In the case of the form of embodiment of the process isolation 10 of the invention shown in FIG. 3, a material combination of PEEK and PTFE is used. PEEK is more temperature stable and tends less to flow than PTFE. Therefore, the edge region of the process isolation 10, especially the gasket 13, is manufactured of PEEK, while the process isolation 10 otherwise is composed of PTFE. Due to the arrangement of the materials, the high-frequency measuring signals 'see' only the PTFE on their passage through the process isolation 10.

FIG. 4 shows a longitudinal section through an antenna unit 3, in the case of which the process isolation 10 is composed of a material combination of PP in the region facing away from the process and PTFE in the region the process facing. Preferably, the PTFE surface layer facing the process is electrically conductively embodied. To accomplish this, e.g. conductive carbon particles 14 are introduced into the PTFE plastic. This is beneficial, since PTFE is basically electrostatically chargeable. The conductive particles 14 are mixed into the PTFE plastic according to certain specifications. The mixing ratio of conductive particles 14 and first plastic 12 is so dimensioned that, on the one hand, the non-chargeable surface is implemented and that, on the other hand, the good microwave transmissivity of the PTFE is influenced not at all or only insignificantly.

The invention claimed is:

1. An apparatus for determining or monitoring the fill level of a fill substance located in a container in a process, comprising:
   a signal producing unit, which produces high-frequency measuring signals;
   an in-coupling/out-coupling unit, which couples the high-frequency measuring signals into an antenna unit, respectively out of the antenna unit; said antenna unit has a hollow conductor and an antenna element widening toward the fill substance; and
   said antenna unit transmits the high-frequency measuring signals in the direction of the surface of the fill substance and receives echo signals reflected on the surface of the fill substance; and
   a control/evaluation unit, which ascertains the fill level of the fill substance in the container based on travel time of the measuring signals, wherein:
   in or on said antenna unit a process isolation is provided, which is at least approximately transparent for the high-frequency measuring signals and which protects said in-coupling/out-coupling unit against influences of the process;
   said process isolation is an isostatically pressed, molded part, which is manufactured of at least two plastics having different physical and/or chemical properties; and
   each of said at least two plastics is provided in respectively defined regions of said process isolation.

2. The apparatus as claimed in claim 1, wherein:
said two plastics comprise a first plastic having a first dielectric constant (DK1) and a second plastic having a second dielectric constant (DK2); and
said two dielectric constants (DK1, DK2) are at least approximately equal.

3. The apparatus as claimed in claim 1, wherein:
said process isolation is embodied gas tightly.

4. The apparatus as claimed in claim 1, wherein:
said first plastic has a higher temperature, pressure- and/or chemical durability than said second plastic.

5. The apparatus as claimed in claim 4, wherein:
said first plastic with the higher temperature, pressure- and/or chemical durability is arranged in the defined region of said process isolation, which faces the process, respectively contacts the process.

6. The apparatus as claimed in claim 5, wherein:
the defined region, in which said first plastic is arranged, is essentially embodied as a surface layer.

7. The apparatus as claimed in claim 1, wherein:
the thickness of the surface layer of said first plastic amounts preferably to $\lambda/4$, wherein $\lambda$ is the wavelength of the high-frequency measuring signals or the center wavelength of a pulse of the high-frequency measuring signals.

8. The apparatus as claimed in claim 1, wherein:
said process isolation has a gasket, which is composed of said first plastic or a third plastic, which has a high temperature- and chemical durability comparable to that of said first plastic; and
the diameter of said gasket is greater than the maximum diameter of said antenna element.

9. The apparatus as claimed in claim 8, wherein:
said first plastic or said third plastic is PTFE or PEEK and said second plastic is PP.

10. The apparatus as claimed in claim 8, wherein:
electrically conductive particle are introduced into said first plastic and/or the said third plastic.

* * * * *